United States Patent
Paul et al.

(10) Patent No.: US 8,102,957 B2
(45) Date of Patent: Jan. 24, 2012

(54) METHOD AND APPARATUS FOR IDENTIFICATION OF TRANSMISSION ANTENNA DIVERSITY IN A RECEIVER

(75) Inventors: Steffen Paul, Baierbrunn (DE); Thomas Ruprich, München (DE)

(73) Assignee: Infineon Technologies AG, Neubiberg (DE)

( * ) Notice: Subject to any disclaimer, the term of this patent is extended or adjusted under 35 U.S.C. 154(b) by 1921 days.

(21) Appl. No.: 10/965,341

(22) Filed: Oct. 14, 2004

(65) Prior Publication Data

US 2005/0123082 A1 Jun. 9, 2005

(30) Foreign Application Priority Data

Oct. 15, 2003 (DE) .................................. 103 47 985

(51) Int. Cl.
*H04B 7/10* (2006.01)
(52) U.S. Cl. ......................................................... 375/347
(58) Field of Classification Search .................. 375/267, 375/299, 347; 455/101
See application file for complete search history.

(56) References Cited

U.S. PATENT DOCUMENTS

| | | | | |
|---|---|---|---|---|
| 5,239,698 | A * | 8/1993 | Dejmek et al. ................. | 455/136 |
| 5,684,836 | A * | 11/1997 | Nagayasu et al. ............ | 375/326 |
| 5,740,526 | A * | 4/1998 | Bonta et al. ................. | 455/277.2 |
| 6,801,782 | B2 * | 10/2004 | McCrady et al. ............. | 455/517 |
| 7,095,727 | B2 * | 8/2006 | Kim et al. ..................... | 370/335 |
| 7,227,905 | B2 * | 6/2007 | Viswanathan ................ | 375/267 |
| 7,324,617 | B1 * | 1/2008 | Banerjee et al. ............. | 375/347 |
| 7,433,297 | B2 * | 10/2008 | Barton et al. ................ | 370/207 |
| 2001/0006531 | A1 * | 7/2001 | Okuyama ..................... | 375/130 |
| 2002/0025012 | A1 * | 2/2002 | Saito et al. ................... | 375/344 |
| 2002/0060996 | A1 * | 5/2002 | Kwak et al. .................. | 370/335 |
| 2004/0077378 | A1 * | 4/2004 | Kim et al. .................. | 455/562.1 |
| 2004/0147234 | A1 * | 7/2004 | Lin et al. ..................... | 455/101 |
| 2004/0250049 | A1 * | 12/2004 | Becker et al. ................... | 712/35 |
| 2004/0252796 | A1 * | 12/2004 | Dabak et al. ................. | 375/347 |
| 2005/0100120 | A1 * | 5/2005 | Barton et al. ................ | 375/347 |
| 2005/0117665 | A1 * | 6/2005 | Becker et al. ................ | 375/316 |

OTHER PUBLICATIONS

"STTD Encoding for PCCPCH", Texas Instruments, TSG-RAN Working Group 1, Meeting #2, Yokohama, Feb. 22-25, 1999, TSGR1#2(99)083, 5 pgs.
"An alternative scheme to detect the STTD encoding of PCCPCH", Texas Instruments, TSG-RAN WG1 meeting #3, Nynashamn, Sweden, Mar. 22-26, 1999, TSGR1#3(99)150, 5 pgs.
"Fast reliable detection of STTD encoding of PCCPCH with no L3 messaging overhead", Texas Instruments, TSG-RAN WG1 meeting #4, Yokohama, Japan, Apr. 18-20, 1999, TSGR1#4(99)372, 4 pgs.
3GPP TS 25.211 Version 4.3.0 (Dec. 2001), pp. 24 and 26.
"Cell Search Performance Analysis for W-CDMA", Andre Zoch and Gerhard P. Fettweis, Dresden University of Technology, Mannesmann Mobilfunk Chair for Mobile Communications Systems, Dresden, Germany, 3 pgs.
WCDMA for UMTS, "Physical Layer", pp. 113-114.

* cited by examiner

*Primary Examiner* — David C. Payne
*Assistant Examiner* — Leon-Viet Nguyen
(74) *Attorney, Agent, or Firm* — Eschweiler & Associates, LLC

(57) ABSTRACT

In a method for identification of a multiple antenna transmission mode in a radio receiver, at least two antenna-decoupled data streams ($s_0$, $s_1$) are produced by means of an antenna decoupling unit in the receiver. Respective first variables ($p_0$, $p_1$) are calculated for both data streams, and are dependent on the phase change between the data in the respective data stream. An evaluation unit uses these first variables as the basis to decide whether a multiple antenna transmission mode is being used in the transmitter.

14 Claims, 6 Drawing Sheets

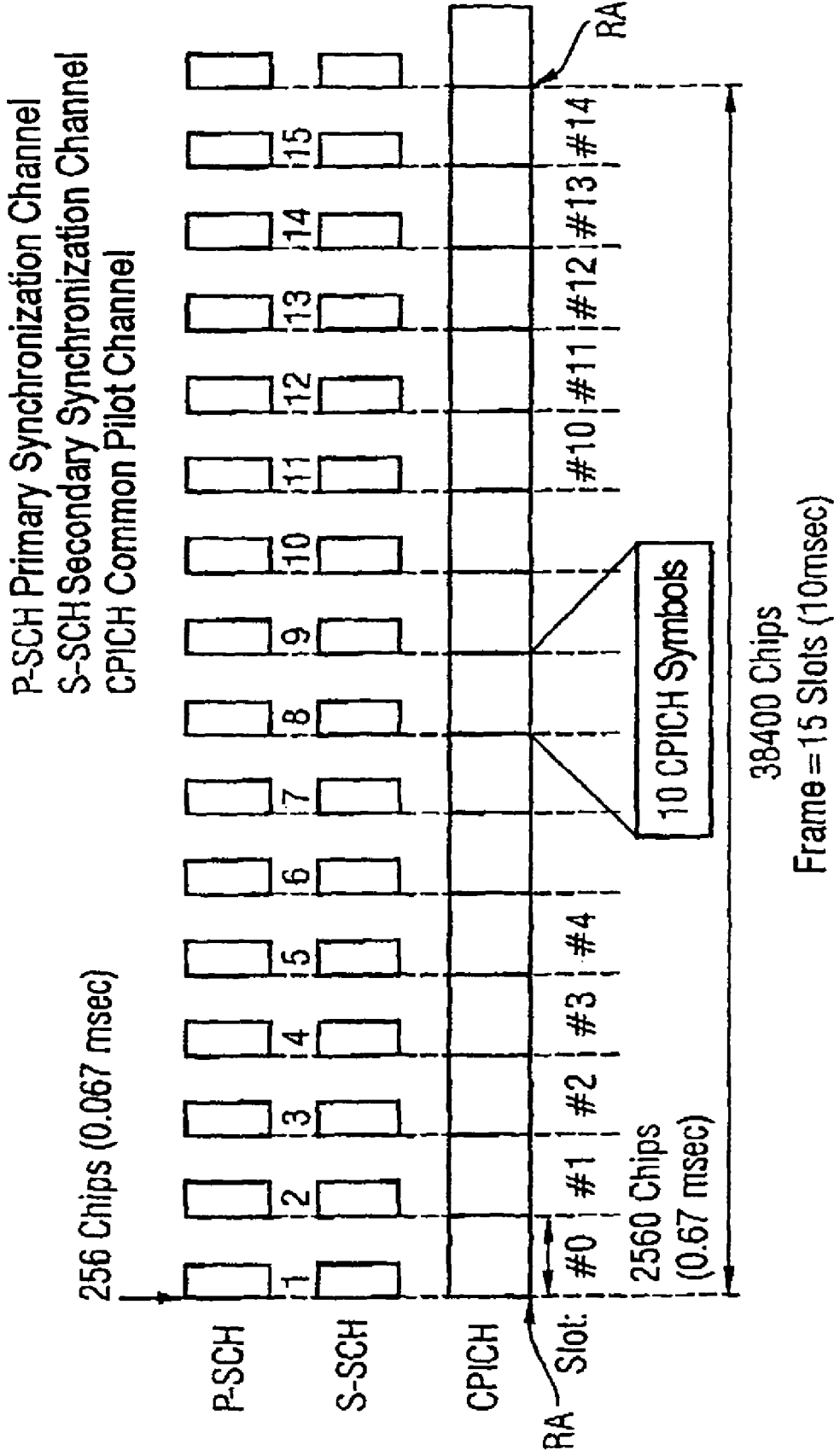

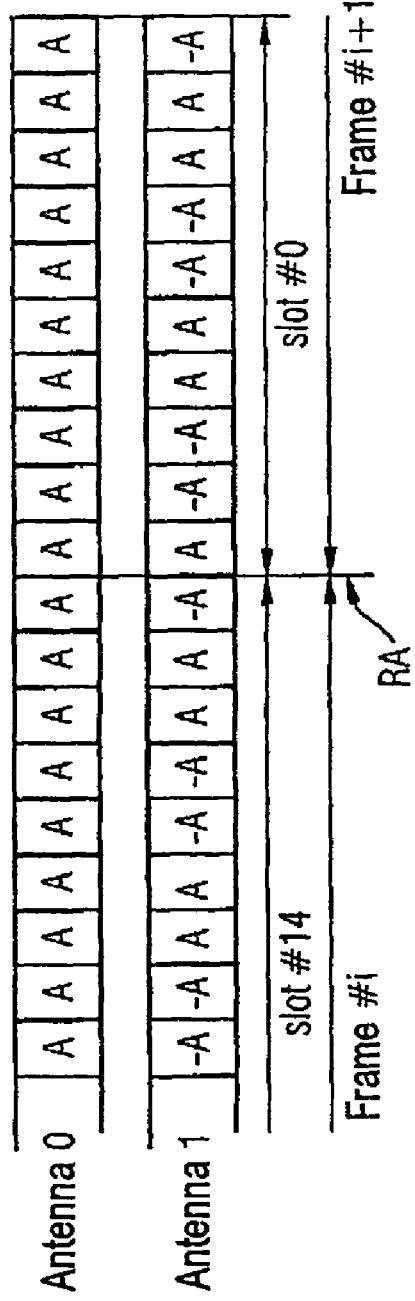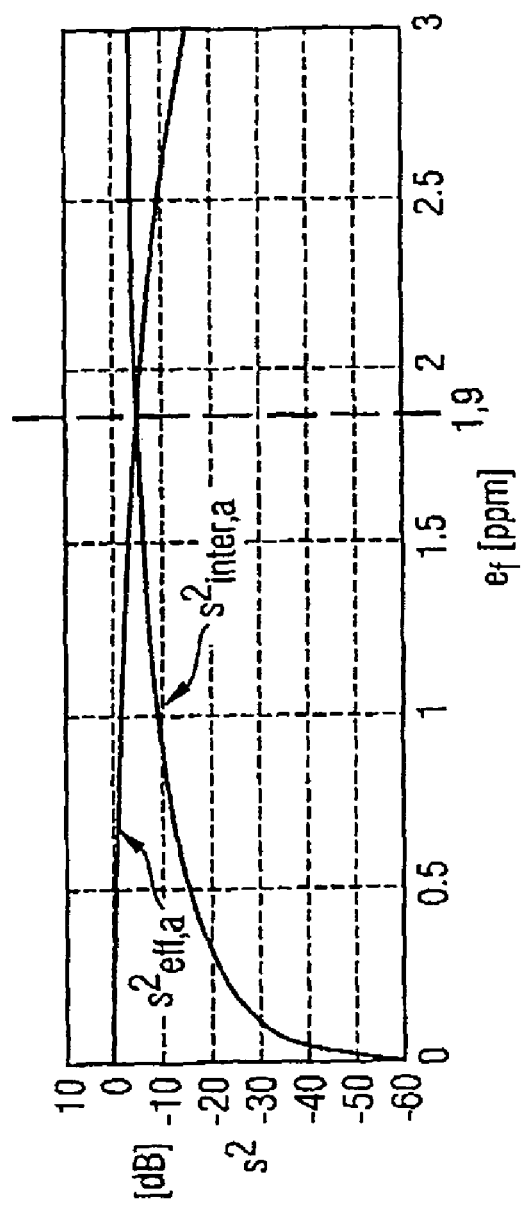

METHOD AND APPARATUS FOR IDENTIFICATION OF TRANSMISSION ANTENNA DIVERSITY IN A RECEIVER

REFERENCE TO RELATED APPLICATIONS

This application claims the benefit of the priority date of German application DE 103 47 985.6, filed on Oct. 15, 2003, the contents of which are herein incorporated by reference in their entirety.

FIELD OF THE INVENTION

The present invention is directed communications, and more particularly is directed to a method and apparatus of identifying antenna diversity-modulated signals in mobile communications systems.

BACKGROUND OF THE INVENTION

Before a data link is set up, mobile radio receivers are synchronized to the transmission and reception clock in one or more base stations. This is generally achieved by means of a three-step method: the slot synchronization (time slot synchronization) is carried out in a first synchronization step. When the slot timings are known, the frame boundaries of the signal are determined in a second synchronization step (frame synchronization). The scrambling code that is being used by the transmitter (base station) is identified in a third synchronization step.

The frequency synchronization and channel estimation which is carried out in order to measure the transmission response of the adaptive mobile radio channel are generally carried out only after the three initial synchronization steps that have been mentioned are complete.

Third-generation mobile radio systems, for example 3GPP (3rd Generation Partnership Project), envisage the use of transmitter-end antenna diversity (so-called TX antenna diversity), which is also referred to in the following text as TX diversity. Transmission-end antenna diversity means that the transmission signal is transmitted from at least two different antennas. If two antennas are used, the emitted signal on at least one of the two antennas is modulated with a specific signal sequence, so that the two transmission signal streams are transmitted simultaneously and orthogonally with respect to one another. Transmitter-end antenna diversity allows the performance of the data transmission system to be significantly improved by means of antenna-specific demodulation when the data is received in the mobile station.

For this purpose, however, the receiver (mobile station) has to know whether a TX diversity method is being used and, if appropriate, which method is being used. In consequence, it is necessary to detect the TX diversity mode as early as possible and as reliably as possible in order to ensure efficient data reception.

Three fundamentally different approaches to solve this detection problem are known from the prior art:

(1) A first option is for the base station to use a monitoring channel to signal to the mobile station that TX diversity is or is not being used. The BCH (Broadcast Channel) can be used as the monitoring channel in UMTS (Universal Mobile Telecommunications System). A method such as this, which is also referred to as layer 3 (L3) signalling, is described in "An alternative scheme to detect the STTD encoding of PCCPCH", Texas Instruments, TSG-RAN WG1 meeting #3, 150, Nynashamn, Sweden 22-26, 16 Mar. 1999.

(2) A second option is to verify transmission antenna diversity by detection of an indicator sequence that is modulated symbol-by-symbol on the synchronization channel. In contrast to the method according to (1), there is no need to use a monitoring channel for notification of the receiver. This method is described in "Fast reliable detection of STTD encoding of PCCPCH with no L3 messaging overhead", Texas Instruments, TSG-RAN WG1 meeting #4, 372, Yokohama Japan, 18-20 Apr. 1999.

(3) A third option is to carry out blind detection of the second TX transmission antenna using pilot sequences (in UMTS, for example, the pilot sequence that is transmitted via the CPICH channel (Common Pilot Channel)). A method such as this is described in "STTD encoding for PCCPCH", Texas Instruments, TSG-RAN Working Group 1, meeting #2, 83, Yokohama 22-25 Feb. 1999. This report proposes that the received data symbols be split on a transmission antenna specific basis (that is to say based on the hypothesis that TX diversity is being used in the transmitter) and that the received pilot symbols then be added coherently (that is to say taking into account the magnitude and the phase) channel-by-channel (that is to say for each transmission antenna). The ratio for the addition result for the main transmission antenna to the addition result for the diversity antenna (whose presence/absence is intended to be tested) is then formed. The determined ratio is subjected to a threshold value comparison. If the ratio is higher than the threshold value, it is assumed that antenna diversity is not being used at the transmitter end. Otherwise, the hypothesis that transmitter-end antenna diversity is being used is confirmed.

The methods described in (1) and (2) require frequency synchronization and knowledge about the transmission channel (carrying out a channel estimation process) in order to obtain acceptable detection results. This additional processing effort and time penalty adversely affects the performance of the initial synchronization. The methods (1) and (2) can therefore generally not be used.

The difficulty with the method described in (3) is that its performance deteriorates very rapidly as the frequency error between the base station and the mobile station increases. A frequency error of more than 1 kHz (0.5 ppm) at a carrier frequency of 2 MHz is sufficient to cause considerable performance degradation. A frequency error of about 4 kHz (1.9 ppm) would result in the method described in (3) detecting a second "virtual" TX transmission antenna with the same probability as the first "real" transmission antenna, even though only the first transmission antenna is being used for transmission (that is to say there is no transmitter-end antenna diversity). Since frequency errors of about 3 ppm may occur during the initial synchronization in practice, the validity of the method according to (3) is sufficiently good only if frequency synchronization has previously taken place between the transmitter (base station) and receiver (mobile station). Early TX diversity detection is thus not possible, even by using this method.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention is directed to a method and an apparatus for identification of antenna diversity-modulated transmission signals that produce a reliable detection result as early as possible in the synchronization procedure. One particular aim is to make it possible to make the decision as to whether the transmitter is being operated with or without antenna diversity even at a time in the receiver at which frequency synchronization has not yet been produced between the transmitter and the receiver, or has been produced only inaccurately.

Accordingly, in the case of the method according to the invention for identification of a multiple antenna transmission mode in a radio receiver, at least two antenna-decoupled data streams are produced in the receiver. A first variable is then calculated for each of the two data streams, wherein the first variable is dependent on the phase change between the data in the respective data stream. The two first variables are then evaluated in order to decide whether a multiple antenna transmission mode is or is not being used in the transmitter.

Accordingly, antenna-decoupled data streams are used for identification of the multiple antenna transmission mode in the receiver. One major aspect of the invention is the processing according to the invention of these two antenna-decoupled data streams. Instead of calculating a sum of data values based on the prior art according to (3), the method according to the invention calculates a first variable for each data stream, wherein the first variable is dependent on the phase change between the data in the respective data stream. Taking account of the phase changes between data values in the evaluation of the calculated first variables results in a method which allows safe and reliable information about the use of a multiple antenna transmission mode in the transmitter even when a frequency error is present (for example, lack of frequency synchronization or poor frequency synchronization between the radio transmitter and the radio receiver). This in turn makes it possible to identify the multiple antenna transmission mode during the initial synchronization, that is to say, for example, in the third synchronization step (scrambling code identification), even before frequency synchronization takes place.

It should be mentioned that the first variable that is calculated for each antenna-decoupled data stream may include the phase change between directly successive data items or else data items separated from one another in the respective data stream. Furthermore, the first variable may also be formed by accumulation of two or more phase changes calculated in this way.

One advantageous embodiment variant of the method according to the invention is characterized in that the first variable for the a-th antenna-decoupled data stream is given by the relationship: $p_a(2i)=s_a(i) \cdot s_a^*(i+1)$, where $s_a(i)$ represents a data value relating to the time index I of the a-th antenna-decoupled data stream, a=0, 1. The phasor $p_a(2i)$ includes not only information relating to the signal strength in the respective antenna-decoupled data stream, but also information relating to the phase difference between successive data items within the antenna-decoupled data stream "a" that is being considered.

One simple option for evaluation of the first variables is to calculate a second variable which comprises the product of the first variable, which is calculated for one antenna-decoupled data stream, and the complex-conjugate of the first variable, which is calculated for the other antenna-decoupled data stream. This second variable will also be referred to in the following text as a differential phasor, and represents a measure of the relative phase changes between the two antenna-decoupled data streams. In other words, the differential phasor allows a comparison of the phase changes of data in the first antenna-decoupled data stream with the phase changes of data in the second antenna-decoupled data stream. If the real part of the differential phasor is greater than or equal to zero, a decision is made that a multiple antenna transmission mode is being used at the transmitter end.

As already mentioned, the data signal that is emitted from the transmitter is coded using a scrambling code that must be identified in the course of the acquisition process in the receiver. Subject to a precondition that the magnitude of the first variable represents a measure of the signal strength in the respective data stream, the transmitted scrambling code is preferably identified by evaluation of at least one of the two first variables. In other words, the magnitude of at least one phasor is used as a decision criterion for scrambling code identification. In this case, it is also advantageous that the scrambling code be identified on the basis of the first variable, so that the multiple antenna transmission mode and the scrambling code can be identified by means of a common signal processing unit (which produces the first variable) on the basis of the same data (first variable). In particular, these two signal processing procedures can then also be carried out at the same time.

The scrambling code may be identified either as a function of only one of the two first variables (with respect to only one of the antenna-decoupled signals) or else as a function of both first variables (with respect to both antenna-decoupled signals). If the frequency error is small, it is more advantageous to use only the first variable relating to the first antenna-decoupled signal, while, if the frequency error is large, it is preferable to evaluate both antenna-decoupled signals (both first variables) in order to identify the scrambling code.

An apparatus according to the invention for identification of a multiple antenna transmission mode in a radio receiver is disclosed. The apparatus comprises an antenna decoupling unit which produces at least two antenna-decoupled data streams from the received signal in the radio receiver, a calculation unit or means which receives the two antenna-decoupled data streams and calculates a first variable for each data stream, wherein the first variable is dependent on the phase change between the data in the respective data stream. The apparatus further includes an evaluation unit that receives the two first variables and decides as a function of the two variables whether a multiple antenna transmission mode is being used in the transmitter. The apparatus of the present invention makes it possible to determine the TX diversity mode being used at the transmitter end even in the presence of frequency errors, for example, in the region of 3 ppm.

BRIEF DESCRIPTION OF THE DRAWINGS

The invention will be described in more detail in the following text using an exemplary embodiment and with reference to the drawings, in which:

FIG. 1 shows a schematic illustration of the channel structure of the synchronization channel SCH and of the common pilot channel CPICH in the UMTS Standard;

FIG. 2 shows a schematic illustration of the modulation pattern when using two transmission antennas in the CPICH channel;

FIG. 3 shows a graph of the measured signal power in the first antenna channel and of the interference power in the second antenna channel resulting from a frequency offset between the base station and the mobile station;

DETAILED DESCRIPTION OF THE INVENTION

Figure 4:
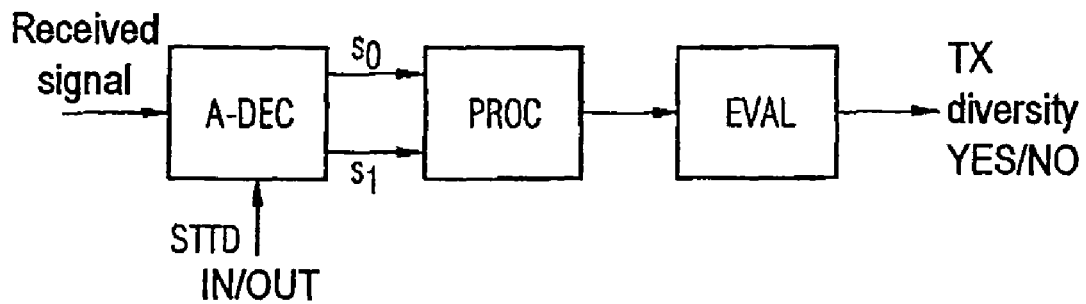
FIG. 4 shows a schematic illustration in order to explain one known signal processing method for identification of the multiple antenna diversity mode.

According to FIG. 1, a UMTS frame has 15 slots. Each slot may contain 2560 chips. The chip time duration in the UMTS Standard is 0.26 µs. In consequence, the slot time duration is 0.67 ms. The frame duration is 10 ms.

Two UMTS channels are involved in the synchronization of the mobile station to a base station (cell search), specifically the synchronization channel SCH and the common pilot channel CPICH. The synchronization channel SCH comprises a first synchronization channel P-SCH (Primary Synchronization Channel) and a second synchronization channel S-SCH (Secondary Synchronization Channel). In the P-SCH, the base station in each case sends the same sequence of 256 chips at the start of each slot. The receiver is synchronized to the slot clock by detection of this sequence, which is known in the receiver.

In the S-SCH, the base station likewise transmits a sequence of 256 chips at the start of each slot. The sequences that are transmitted in the individual slots are, however, different. The receiver uses the slot synchronization, which already exists, to detect the different sequences in the S-SCH. The receiver uses the detected sequences in the S-SCH to determine those slots which form frame starts RA. Furthermore, by the choice and sequence of the transmitted second sequences, the base station signals to the receiver the code group from which the scrambling code that is being used in the base station originates. This restricts the number of possible scrambling codes, thus simplifying the scrambling code identification process that takes place in the next step.

After the slot and frame synchronization, the receiver uses the SCH to identify the scrambling code on the basis of the CPICH. Ten CPICH symbols are transmitted in each slot. Each CPICH symbol is a sequence that is known in the receiver and comprises 256 chips. Since the CPICH is scrambled using a scrambling code, it can be used for identification of the scrambling code that is being used by the base station. When TX diversity is being used (two transmission antennas are used for TX diversity in the UMTS Standard), the CPICH is transmitted via both transmission antennas. This means that the CPICH is in principle suitable for TX diversity mode identification in the receiver. The TX diversity method that is being used for the CPICH is specified as STTD (Space Time Transmit Diversity) in the UMTS Standard.

FIG. 2 shows the STTD modulation pattern in the CPICH. The symbols which are transmitted from the main antenna (antenna 0) are multiplied by the value A=1+j (j being the imaginary unit). The symbols which are transmitted via the diversity antenna (antenna 1) are modulated with the sequence A, −A, −A, A, . . . . Only the antenna 0 is used without STTD, that is to say in the normal mode. Both antennas 0, 1 are used in the STTD mode, as shown in FIG. 2. Further details relating to the STTD mode can be found in Section 5.3.1.1.1 (Space Time Block Coding Based Transmit Antenna Diversity (STTD)) and Section 5.3.3.1 (Common Pilot Channel (CPICH)) of the 3GPP TS 25.211 V4.4.0 (2002-03) standard, which are hereby incorporated by reference in their entirety.

In addition to the slot and frame synchronization, which has been explained with reference to FIG. 1, and the identification of the scrambling code which is being used by the base station, it must be possible for the receiver to identify whether STTD is or is not being used at the transmitter end. Determination of the incorrect diversity mode would lead to a considerable reduction in the performance of the receiver.

The received signal is processed in the receiver as a function of whether TX diversity is or is not being used in the transmitter (although this is initially unknown in the receiver). FIG. 4 shows an illustration of the receiver-end processing steps for determination of the TX diversity mode that is being used at the transmitter end. The illustration relates essentially to the prior art as described in (3), and is intended to explain its disadvantages. In principle, the receiver can be operated in the STTD reception mode (STTD ON) or in the normal reception mode (STTD OFF). In the STTD reception mode, the received signal is broken down into antenna-decoupled signals $s_0$ and $s_1$ by means of an antenna decoupling unit A-DEC. In the idealized, optimum case (inter alia with no frequency offset between the base station and the receiver), the breakdown is perfect, that is to say the data in the signal $s_0$ originates from the antenna 0 (main antenna), and the data in the signal $s_1$ originates from the antenna 1 (diversity antenna). The A-DEC unit is deactivated in the normal reception mode, that is to say no antenna decoupling is carried out and only the signal $s_0$ is present. The signal $s_0$ or the two antenna-decoupled signals $s_0$ and $s_1$ is or are supplied to a signal processing unit PROC, which calculates an evaluation variable. An evaluation unit EVAL evaluates the evaluation variable that is obtained and decides whether TX diversity is or is not present.

An STTD modulated transmission signal that is received in the normal reception mode (STTD-OFF) in the receiver results in:

$$\begin{bmatrix} s_0(k) \\ s_0(k+1) \\ s_0(k+2) \\ s_0(k+3) \end{bmatrix} = \begin{bmatrix} F_N \begin{pmatrix} 1 & 0 \\ 0 & e^{j\phi} \end{pmatrix} \begin{pmatrix} 1 & 1 \\ 1 & -1 \end{pmatrix} \\ F_N e^{2j\phi} \begin{pmatrix} 1 & 0 \\ 0 & e^{j\phi} \end{pmatrix} \begin{pmatrix} 1 & -1 \\ 1 & 1 \end{pmatrix} \end{bmatrix} \cdot \begin{bmatrix} x_0 \\ x_1 \end{bmatrix} + \begin{bmatrix} n_0(k) \\ n_0(k+1) \\ n_0(k+2) \\ n_0(k+3) \end{bmatrix}. \quad (1)$$

If the receiver is being operated in the STTD reception mode STTD ON (that is to say antenna decoupling is being carried out by means of the antenna decoupling unit A-DEC), the antenna-decoupled signals are given by:

$$\begin{bmatrix} s_0(i) \\ s_1(i) \\ s_0(i+1) \\ s_1(i+1) \end{bmatrix} = \begin{bmatrix} \begin{pmatrix} 1 & 1 \\ 1 & -1 \end{pmatrix} & F_N & \begin{pmatrix} 1 & 0 \\ 0 & e^{j\phi} \end{pmatrix} \begin{pmatrix} 1 & 1 \\ 1 & -1 \end{pmatrix} \\ \begin{pmatrix} 1 & 1 \\ -1 & 1 \end{pmatrix} & F_N e^{2j\phi} & \begin{pmatrix} 1 & 0 \\ 0 & e^{j\phi} \end{pmatrix} \begin{pmatrix} 1 & -1 \\ 1 & 1 \end{pmatrix} \end{bmatrix} \cdot \begin{bmatrix} x_0 \\ x_1 \end{bmatrix} + \begin{bmatrix} n_0(i) \\ n_1(i) \\ n_0(i+1) \\ n_1(i+1) \end{bmatrix}. \quad (2)$$

In this case, $x_0$ denotes a CPICH symbol transmitted from the antenna 0, and $x_1$ denotes a CPICH symbol transmitted from the antenna 1. The transmitter-end STTD modulation (FIG. 2) is represented by the matrices $$\begin{bmatrix} 1 & 1 \\ 1 & -1 \end{bmatrix} \text{ and } \begin{bmatrix} 1 & -1 \\ 1 & 1 \end{bmatrix}.$$

The index k denotes the time index for received CPICH symbols, while the index i denotes the time index for antenna-decoupled CPICH symbols. The scaling factor $F_N$ is defined by:

$$F_N \frac{1}{N} \sum_{n=0}^{N-1} e^{j2\pi n \Delta \varphi}, \quad (3)$$

where $\Delta\phi$ indicates the phase change between two successive chips and N=256 indicates the number of chips per CPICH symbol.

The phase change $\Delta\phi$ is obtained using the formula $$\Delta \varphi = \frac{\Delta f}{f_{chip}} \quad (4)$$

from the frequency offset $\Delta f$ and from the chip rate $f_{chip}$ (3.84 MHz), with the frequency offset being obtained from the relative frequency error $e_f$ in ppm based on $\Delta f=10^{-6} \cdot e_f [ppm] \cdot f_c$. In this case, $f_c$ denotes the carrier frequency (2 GHz). The phase shift of a despread CPICH symbol is given by the variable $\phi$ where $$\phi = \arg F_N \quad (5).$$

In order to assist understanding of the invention, a TX diversity detection method which is not according to the invention will be explained first of all in the following text. The method is based on the following assumptions:

The transmitted total signal power $\sigma_s^2$ is independent of whether TX diversity is or is not being used in the transmitter. That is to say $\sigma_0^2 \sigma_1^2 = \sigma_s^2 = \text{const}$, where $\sigma_0^2$ and $\sigma_1^2$ respectively denote the power transmitted via the antennas 0 and the power transmitted via the antenna 1.

The noise elements contained in the antenna-decoupled signals $s_0$ and $s_1$ are identical, that is to say $\sigma_n^2 = E\{n_0\}^2 = E\{n_1\}^2$, where $E\{\cdot\}^2$ denotes the square of the expected value of the random variable $\{\cdot\}$.

In the case of the STTD reception mode (STTD ON), the received power element from the antenna 0 is $$\sigma_0^2 = \frac{1}{2}\sigma_s^2,$$

and the received power element from the antenna 1 is $$\sigma_1^2 = \frac{1}{2}\sigma_s^2.$$

In the case of the STTD normal mode (STTD OFF), the received power element from the antenna 0 is $\sigma_0^2 = \sigma_s^2$, and the received power element from the antenna 1 is $\sigma_1^2 = 0$.

Subject to these preconditions, the TX diversity mode can be determined by means of the circuit illustrated in FIG. 4, by the unit PROC coherently determining the total signal power in the form of an evaluation signal $E\{s_0(i)+s_1(i)\}^2$. Furthermore, switching takes place at the receiver end between the STTD reception mode (with antenna decoupling) and the normal reception mode (without antenna decoupling) in the course of the method, and the total power levels obtained in the two modes are compared with one another. If no TX diversity is being used at the transmitter end, $$\frac{1}{2}\sigma_s^2 + \sigma_n^2$$

is obtained as the total power in the STTD reception mode (STTD ON), and $\sigma_s^2 + \sigma_n^2$ is obtained in the normal reception mode (STTD OFF). In the situation where TX diversity is being used at the transmitter end, a total power of $2\sigma_s^2 + 2\sigma_n^2$ is determined in the STTD reception mode (STTD ON), and a total power of $\sigma_n^2 + 2\sigma_n^2$ is determined in the normal reception mode (STTD OFF). The evaluation unit EVAL then checks which of the two reception modes provided the greater total determined signal power. If the greater total signal power was determined in the STTD reception mode, this means, on the basis of these statements, that the transmitter is operating in the TX diversity mode. If the greater total signal power is measured in the normal reception mode, it follows that TX diversity is not being used at the transmitter end.

The disadvantage of the method explained above (coherent determination of the total signal power and decision on whether the diversity mode is being used at the transmitter end as a function of the total signal powers determined in the different reception modes) is that it is sensitive to a frequency offset (frequency error) between the base station and the mobile station. This is shown below:

With a frequency offset of $$\Delta f = \frac{\phi}{2\pi T_s}$$

($T_s$ denotes the symbol time duration of a CPICH symbol), the following relationship is obtained from equation (2):

$$\begin{bmatrix} s_0(i) \\ s_1(i) \\ s_0(i+1) \\ s_1(i+1) \end{bmatrix} + \quad (6)$$

$$F_N \begin{bmatrix} 1+e^{j\phi} & 1-e^{j\phi} \\ 1-e^{j\phi} & 1+e^{j\phi} \\ e^{j2\phi}(1+e^{j\phi}) & e^{j2\phi}(-1+e^{j\phi}) \\ e^{j2\phi}(-1+e^{j\phi}) & e^{j2\phi}(1+e^{j\phi}) \end{bmatrix} \cdot \begin{bmatrix} x_0 \\ x_1 \end{bmatrix} + \begin{bmatrix} n_0(i) \\ n_1(i) \\ n_0(i+1) \\ n_1(i+1) \end{bmatrix}.$$

The effective signal element from the antenna a=0, 1 is:

$$s_{\mathit{eff},a} = x_a F_N e^{jb2\phi}(1+e^{j\phi}) + n_a,\ b = \begin{cases} 0:i \\ 1:i+1 \end{cases}, \quad (7)$$

and the interference element in the signal $s_a$, which is caused by the "other" antenna $\bar{a}$, where $\bar{a}$=mod {(a+1),2}, is $$s_{\mathit{inter},a} = (-1)^b x_{\bar{a}} F_N e^{jb2\phi}(1+e^{j\phi}) + n_a,\ b = \begin{cases} 0:i \\ 1:i+1 \end{cases}. \quad (8)$$

The effective power element from the antenna a relating to the antenna-decoupled signal $s_a$ is thus:

$$s_{\mathit{eff},a}{}^2 = |F_N|^2(1+\cos\phi)\sigma_a^2, \quad (9)$$

and the interference power element caused by the transmission antenna $\bar{a}$ in the antenna-decoupled signal $s_a$ is:

$$s_{\mathit{inter},a}{}^2 = |F_N|^2(1-\cos\phi)\sigma_{\bar{a}}^2. \quad (10)$$

The power elements indicated in the equations (9) and (10) are plotted against the relative frequency error $e_f$ in ppm in FIG. 3. As can be seen, for a frequency error of 1.9 ppm, the interference element from the antenna 0 (1) in the antenna-decoupled signal $s_1$ ($s_0$) has the same magnitude as the effective element from the "correct" antenna 0 (1) for the antenna-decoupled signal $s_0$ ($s_1$). It is thus no longer possible to distinguish between the real transmission antenna and the virtual transmission antenna in the receiver at the latest with a relative frequency error of 1.9 ppm.

Figure 5:
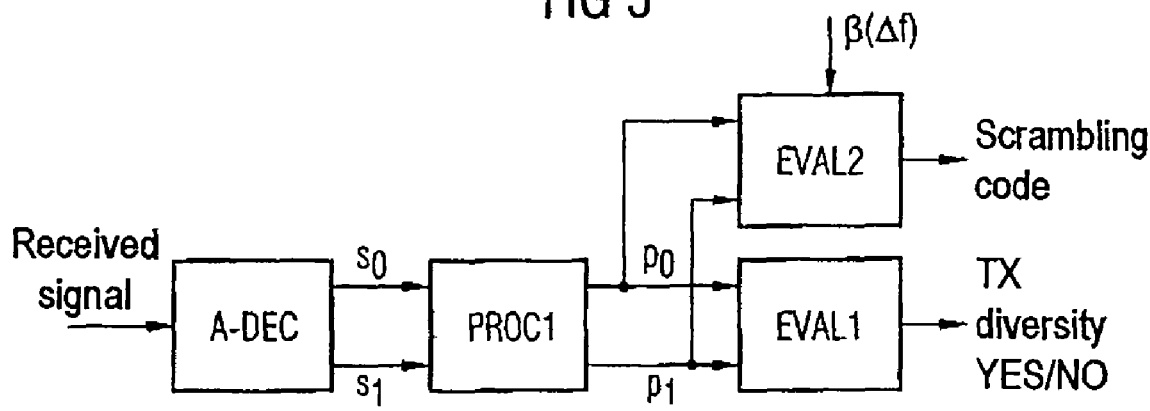
FIG. 5 shows a schematic illustration in order to explain the signal processing procedures for the method according to the invention, as well as the design of an apparatus according to the invention for identification of the multiple antenna diversity mode.

FIG. 5 shows the general design of the apparatus according to the invention for identification of a multiple antenna transmission mode in a radio receiver, illustrated schematically. As has already been described in conjunction with FIG. 4, antenna-decoupled signals $s_0$, $s_1$ are calculated by the antenna decoupling unit A-DEC in the STTD reception mode. The antenna-decoupled signals $s_0$, $s_1$ are converted in a signal processing unit PROC1 to a first variable $p_0$ for the antenna 0, and a first variable $p_1$ for the antenna 1, using the following relationship:

$$p_a(2i) = s_a(i) \cdot s_a^*(i+1),\ a=0,1 \quad (11)$$

The phase relationship between two successive antenna-decoupled symbols $s_a(i)$, $s_a(i+1)$ is taken into account by means of the phasors $p_a(2i)$.

In order to evaluate the phasors $p_a(2i)$, a differential phasor is calculated in an evaluation unit EVAL1 from the phasors relating to the different antennas:

$$p_{0,1}(2i) = p_0(2i) \cdot p_1^*(2i). \quad (12)$$

The phase difference $\Phi$ between the phasors $p_0$ and $p_1$ is $$\Phi = \arg\{p_{0,1}(2i)\}. \quad (13)$$

The following text shows that the phase difference $\Phi$ is a suitable variable for answering the question as to whether the second detected antenna (in this case the antenna 1) is only a virtual antenna (that is to say the transmitter is being operated without TX diversity) or is a real antenna (that is to say the antenna is using TX diversity).

The following expressions are obtained from the equation (11), taking into account the symbol phase shift $\phi$:

$$p_0(2i) = e^{-j2\phi}[2\sigma_s^2(1-\alpha+\cos\phi) - j2\alpha\sigma_s^2\sin\phi] + \tilde{n}_0$$

$$p_1(2i) = e^{-j2\phi}[-2\sigma_s^2(1-\alpha-\cos\phi) - j2\alpha\sigma_s^2\sin\phi] + \tilde{n}_1. \quad (14)$$

In this case, the parameter $\alpha$ denotes the TX diversity mode which is being used at the transmitter end: $\alpha=0$ means that the transmitter is being operated in the normal mode (without TX diversity), and $\alpha=1$ means that the transmitter is being operated in the STTD mode (with TX-diversity). $\tilde{n}_0$ and $\tilde{n}_1$ are complex noise elements.

The phase difference $\Phi$ is given by:

$$\Phi = \arg\{\alpha - 1 + \cos^2\phi + \alpha\sin^2\phi + j2\alpha(\sin\phi - \alpha\sin\phi) + \tilde{n}\} \quad (15)$$

$$= \arg\{\alpha - 1 + \cos^2\phi + \alpha\sin^2\phi + \tilde{n}\}$$

$$= \begin{cases} \arg\{-(1-\cos^2\phi) + \tilde{n}\}: \alpha = 0 \\ \arg\{1+\tilde{n}\}: \alpha = 1 \end{cases},$$

where $\tilde{n}$ is a combined complex noise element.

If it is assumed that the combined noise element $\tilde{n}$ is small in comparison to the signal strength, that is to say it can be ignored in equation (15), it follows from equation (15) that, for a phase difference of $\Phi$ in the interval $[0, \pi/2]$, the transmitter is being operated in the STTD mode ($\alpha=1$), while a phase difference of $\Phi$ in the interval $[\pi/2, \pi]$ means that the transmitter is being operated in the normal mode ($\alpha=0$). A statement about the TX diversity mode that is being used in the transmitter can thus be made by evaluation of the phase difference $\Phi$ in the evaluation unit EVAL1, independently of the magnitude of the symbol phase shift $\phi$ or of the frequency offset $\Delta f$. Only excessive noise (large values of $\tilde{n}$) can lead to an incorrect decision.

Figure 6:
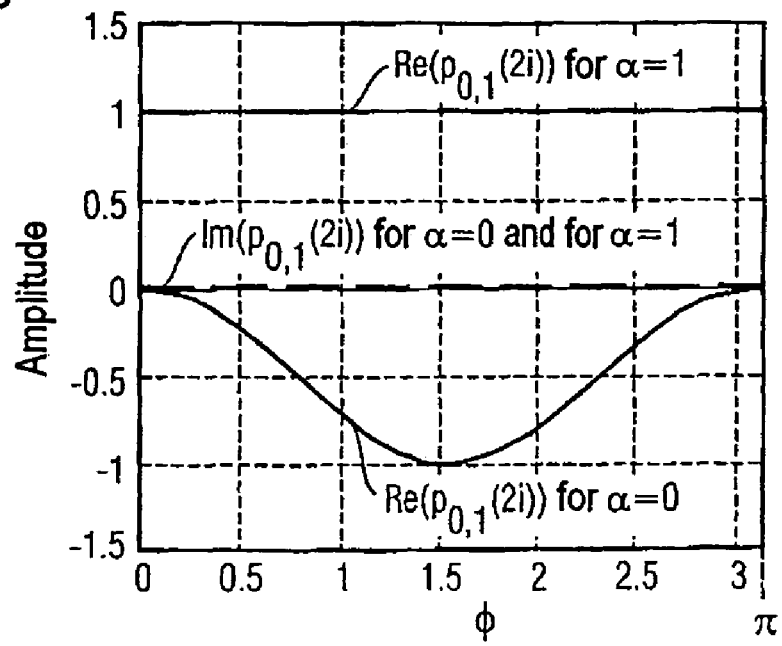
FIG. 6 shows a graph of the real part and of the imaginary part of the differential phasor without and with transmitter-end antenna diversity, plotted against the symbol phase error.

FIG. 6 shows the real part and the imaginary part of the differential phasor $p_{0,1}(2i)$ for the case where $\alpha=0, 1$. The imaginary part of the differential phasor $p_{0,1}(2i)$ is always 0, according to equation (15). The real part of the differential phasor $p_{0,1}(2i)$ is equal to the value 1 when $\alpha=1$, and assumes only negative values when $\alpha=0$. The following decision function D can thus be implemented in the evaluation unit EVAL1 as a simplification for the evaluation of the phase difference $\Phi$:

$$D = \mathrm{sign}\{\mathrm{Re}(p_{0,1}(2i))\} \quad (16)$$

$$= \begin{cases} -1: & \alpha = 0 \text{ (without } TX \text{ antenna diversity)} \\ 1: & \alpha = 1 \text{ (with } TX \text{ antenna diversity)} \end{cases}.$$

FIG. 6 shows that the decision function D is dominated by noise where the phase difference Φ is a multiple of π for α=0. In this case, it is not possible to make a reliable decision on whether the TX diversity mode is being used in the transmitter. It is therefore proposed that a decision be made on the basis of equation (16) only when the magnitude of the phasor $p_0(2i)$ (or some other variable which is dependent on the signal power of the first antenna, such as $s_0(i) \cdot s_0^*(i)$) and, at the same time, the magnitude of the phasor $p_1(2i)$ (or some other variable which is dependent on the signal power of the second antenna, such as when $s_1(i) \cdot s_1^*(i)$) both exceed a specific threshold value (or respective specific threshold values). In this case, two transmission antennas are detected, although in some circumstances these are virtual transmission antennas. In order to finally decide whether antenna diversity is being used, the procedure according to equation (16) is then used in the manner according to the invention. In the situation where only one or neither of the two variables which are dependent on the signal powers of the antennas exceeds or exceed the threshold value or values (noise dominance), no evaluation on the basis of equation (16) is carried out, and it is assumed that α=0 (no TX antenna diversity).

It should be mentioned that there is no need for the receiver to be switched between the reception modes (STTD reception mode/normal reception mode) during the method according to the invention. This means that, according to the invention, there is no need for any switching (STTD ON/OFF) of the antenna decoupling unit A-DEC.

As already mentioned, one advantage of the method according to the invention is that the identification of the TX diversity mode which is being used in the transmitter can be carried out before frequency synchronization of the receiver to the base station, that is to say in particular at the same time as the scrambling code identification. The following text explains a method which allows the scrambling code to be identified on the basis of the phasors $p_0(2i)$ and $p_1(2i)$ with the antenna decoupling unit A-DEC (STTD ON) activated. This allows the TX diversity mode and the scrambling code to be identified on the basis of the same hardware (A-DEC, PROC1).

The scrambling code identification is based on a power measurement. The index m=0, 1, . . . , 7 denotes the scrambling codes which are available as candidates in the code group (determined during the frame synchronization). The received signal is correlated (multiplied) in a manner that is not illustrated but at the correct time with all the scrambling codes m, and the correlation power $\sigma_m^2$ is determined. The sought scrambling code number is obtained from the following equation:

$$ScrCode\ \# = \max_m \{\sigma_1^2; \sigma_2^2; \ldots ; \sigma_m^2; \ldots \sigma_7^2\}. \tag{17}$$

In this case, the total power of the scrambling code with the index m is given by the expression:

$$\sigma_m^2 = \sigma_{m,0}^2 + \sigma_{m,1}^2 \tag{18}$$

First of all, the following text will explain why power determination is possible on the basis of the phasors $p_0(2i)$ and $p_1(2i)$, respectively.

From the definition of the phasors, it can be stated that (independently of the index m—which is therefore omitted):

$$\begin{aligned} p_a &= S_a(i+1)^* s_a(i) \\ &= |s_a(i+1)| e^{-j\phi} |s_a(i)| \\ &= |s_a(i+1)||s_a(i)| e^{-j\phi}. \end{aligned} \tag{19}$$

on the assumption that $|s_a(i)|=|s_a(i+1)|$, it follows that:

$$p_a = \sigma_a^2 e^{-j\phi}. \tag{20}$$

This means that the magnitude of the phasor indicates the power in the corresponding antenna channel, and is thus in principle suitable for (power-based) scrambling code identification. FIG. 5 illustrates a second evaluation unit EVAL2 for scrambling code identification, which receives the phasors $p_0(2i), p_1(2i)$. The second evaluation unit EVAL2 is arranged in parallel with the first evaluation unit EVAL1.

In principle, various options are available for power measurement:
1. Evaluation of the phasor $p_0(2i)$ in the normal reception mode (STTD OFF).
2. Either evaluation of one of the phasors $p_0(2i)$ or $p_1(2i)$, that is to say of the power $\sigma_{m,0}^2$ or $\sigma_{m,1}^2$ of only one of the antenna channels, or evaluation of $p_0(2i)$ and $p_1(2i)$, in order to determine the total power $\sigma_m^2$ in the STTD reception mode (STTD ON).

The options quoted in 2 are distinguished by the parameter β: β=0 denotes the evaluation of only one phasor, and β=1 denotes the evaluation of both phasors for the power measurement.

The choice of a suitable STTD reception mode in the unit A-DEC and of a suitable evaluation mode in the unit EVAL2 should be made so as to make it possible to achieve a signal-to-noise ratio that is as high as possible. The signal gain factors for the reception path illustrated in FIG. 5 are stated in the following text for the options defined by STTD OFF/ON, β=0, 1, for the situation with transmitter-end TX antenna diversity (α=1) and for the situation without transmitter-end TX antenna diversity (α=0). In this case, it is also assumed that $\sigma_0^2 + \sigma_1^2 = \sigma_s^2 = $const:

1. STTD OFF

The signal gain factor for reception in the normal mode (no antenna decoupling, evaluation of the phasors $p_0(2i)$ for the antenna 0 based on individual CPICH symbols is:

$$\begin{aligned} g_{0,normal} &= |F_N|^2 \frac{\sigma_0^2}{\sigma_a^2} \\ &= |F_N|^2 \left(1 - \frac{\alpha}{2}\right) \\ &= \begin{cases} |F_N|^2 & : \alpha = 0 \\ \frac{1}{2}|F_N|^2 & : \alpha = 1 \end{cases}. \end{aligned} \tag{21}$$

2. STTD ON 2.1 β=0 (only the magnitude of one phasor $|p_a(2i)|$ is considered in the evaluation):

The signal gain factor is given by:

$$g_{\beta=0, STTD} = \frac{|F_N|^2 \sigma_0^2 (1 + \cos\phi) + \alpha \sigma_1^2 (1 - \cos\phi)}{\sigma_a^2} \tag{22}$$

-continued $$= |F_N|^2(1 + \cos\phi - \alpha\cos\phi)$$

$$= \begin{cases} |F_N|^2(1 + \cos\phi) & : \alpha = 0 \\ |F_N|^2 & : \alpha = 1 \end{cases}.$$

2.2 β=1 (the sum of the magnitudes of both phasors is taken into account in the evaluation):
The signal gain factor is given by:

$$g_{\beta=1,STTD} = |F_N|^2 \frac{2\sigma_0^2 + \alpha 2\sigma_1^2}{\sigma_a^2} \tag{23}$$

$$= |F_N|^2(2 - \alpha + \alpha)$$

$$= 2|F_N|^2.$$

Figure 7:
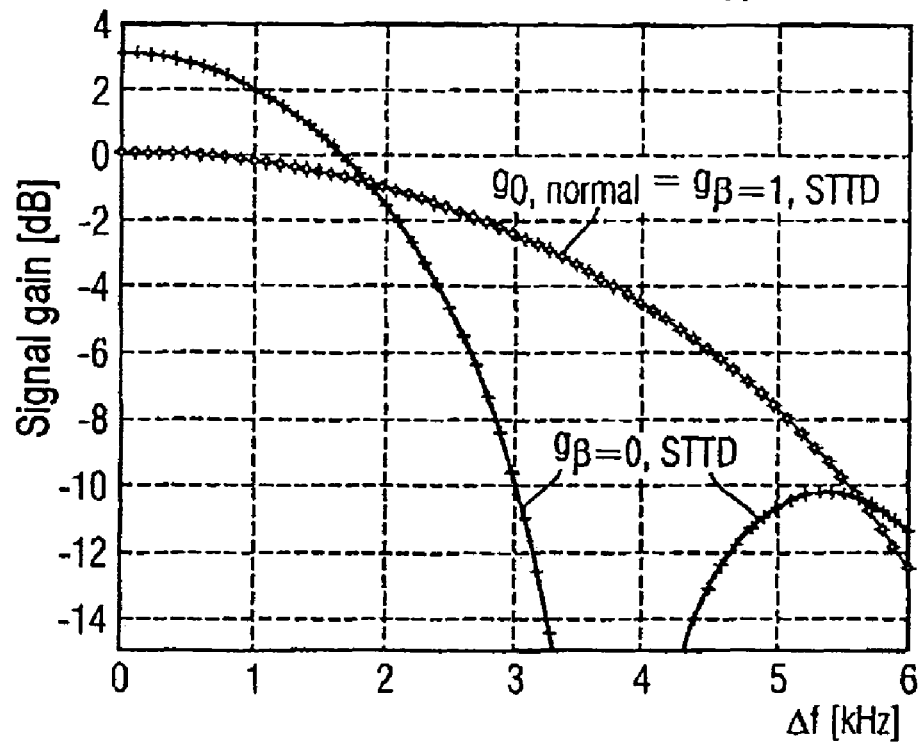
FIG. 7 shows a graph of the signal gain without antenna diversity plotted against the frequency offset.

FIG. 7 shows a graph of the signal gain factors plotted against the frequency offset Δf without the use of TX diversity in the transmitter, that is to say α=0. The curves $g_{0,normal}$ and $g_{\beta=1,STTD}$ coincide. The signal gain $g_{\beta=0,STTD}$ is at its greatest for a frequency offset up to about 2 kHz (1.0 ppm).

Figure 8:
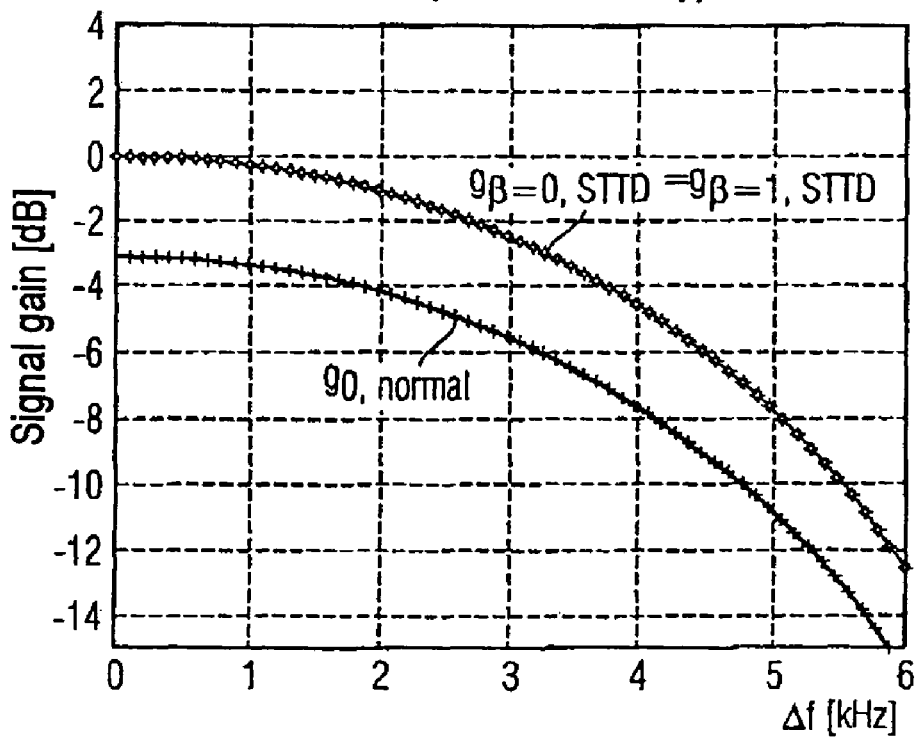
FIG. 8 shows a graph of the signal gain with antenna diversity plotted against the frequency offset.

FIG. 8 shows a graph of the signal gain factors plotted against the frequency offset Δf when using TX diversity in the transmitter, that is to say α=1. The curves $g_{\beta=0,STTD}$ and $g_{\beta=1,STTD}$ coincide. The signal gain in the STTD reception mode is greater than in the normal reception mode for all frequency offsets between 0 and 6 kHz (3.0 ppm).

FIGS. 7 and 8 show that the maximum signal gain can always be achieved in the STTD reception mode (STTD ON). This means that the antenna decoupling unit A-DEC can also always be operated in the STTD reception mode for identification of the scrambling code. In the same way as when determining the TX diversity, there is no need to switch the antenna decoupling unit A-DEC. This together with the suitability of the phasors $p_0(2i)$, $p_1(2i)$ for power determination allow the two evaluation units EVAL1 and EVAL2 to be arranged in parallel.

FIGS. 7, 8 show that only the magnitude of the phasor $p_0(2i)$ for the first antenna channel need be taken into account for a frequency offset of Δf<2 kHz, while the antenna-combined signal evaluation (sum of the two phasor magnitudes) is more advantageous for greater frequency offsets of Δf≧2 kHz. The evaluation mode β for the evaluation unit EVAL2 is thus switched as a function of the maximum frequency offset Δf to be expected.

Figure 9:
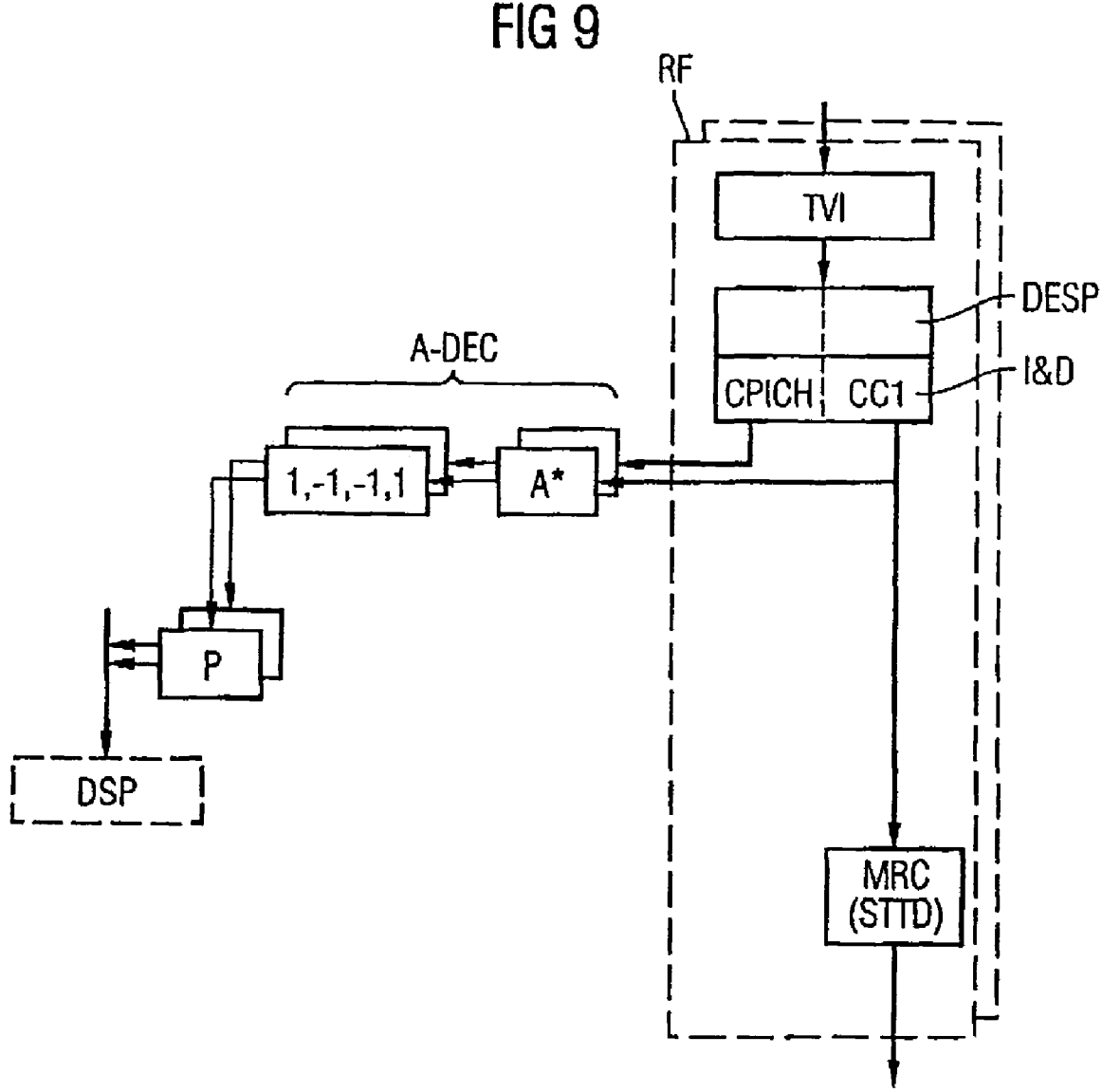
FIG. 9 shows a schematic illustration of one hardware implementation of one exemplary embodiment of the apparatus according to the invention.

FIG. 9 shows a detail of one implementation of the apparatus according to the invention in a mobile radio receiver. The illustration shows a two-channel rake finger RF for demodulation of two physical channels. The rake finger RF is constructed in a known manner. On the input side, it has an interpolator TVI (Time Variant Interpolator) which slaves the sampling rate of the digital incoming received signal to the sub-chip base. The signal path downstream from the interpolator TVI includes a despreading step DESP, which despreads the scrambling code and the channelization code. An integrator I&D (Integrate&Dump) in each case integrates (adds) SF chips in a known manner, with SF being the spreading factor for the respective channel (CPICH: SF=N=256). The symbols from the two channels (CPICH and from a further channel which is denoted CC1) are emitted at the output of the integrator I&D, and are demodulated by the two-channel rake finger RF. The symbols from the second channel CC1 are passed to a combiner MRC (Maximum Ratio Combiner) while the CPICH symbols are supplied to the antenna decoupling unit A-DEC.

The antenna decoupling unit A-DEC is in the form of hardware and, on the input side, has a multiplier which multiplies the CPICH symbols by the complex variable A*. The antenna demodulation is carried out by means of multiplexers, using the STTD modulation pattern 1, −1, −1, 1.

The phasors are calculated in dedicated hardware in a task-specific processor P. The processor P provides the following variable at its output for a digital signal processor DSP:

$$p_{a,m} = \sum_{i=n}^{n+N-1} (s_{a,m}^*(i - D') \cdot s_{a,m}(i)). \tag{24}$$

Figure 10:
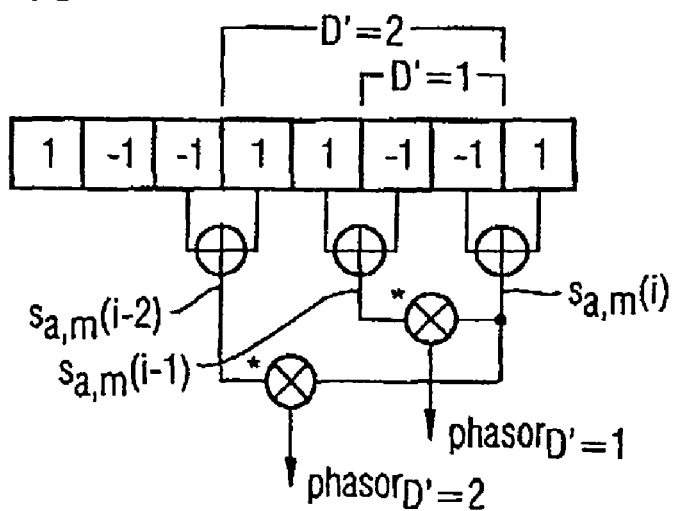
FIG. 10 shows a schematic illustration of a calculation circuit for calculation of the first variable (phasors) in the two antenna channels.

In this case, a denotes the antennas 0 or 1, m=1, ..., M denotes the scrambling code under consideration, and N denotes the number of phasors or products of symbol pairs which are added in order to improve the detection result. The index of the received symbol pair or of the received phasor of received CPICH symbols is denoted n. Normally, N varies between 4 and 16 (which corresponds to 8 to 32 received symbols). FIG. 10 shows the significance of the parameter D'. The antenna-decoupled symbols are produced after the addition process (that is to say one antenna-decoupled symbol $s_{a,m}(i)$ is in each case formed in the antenna decoupling unit A-DEC from two successive received symbols). D' is preferably set to be equal to 1 in order to determine the TX diversity mode, that is to say directly successive antenna-decoupled symbols are multiplied, since a significant frequency offset must be assumed.

Figure 11:
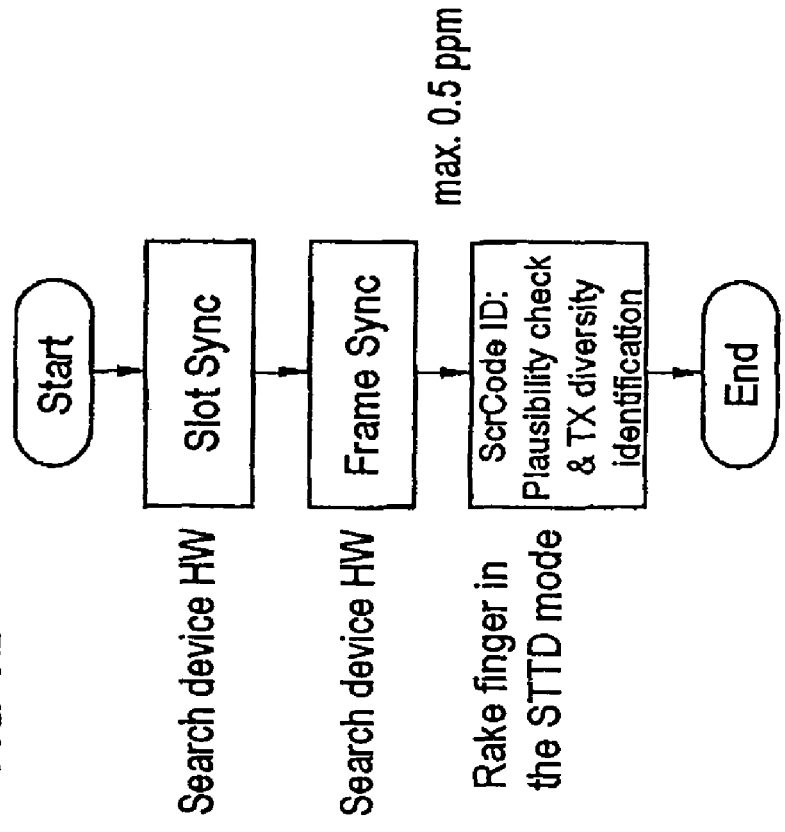
FIG. 11 shows a flowchart for carrying out an initial cell search.

FIG. 11 shows a flowchart for the overall synchronization process that is carried out during initial synchronization ("initial cell search"). Once the slot and frame synchronization has been carried out, a maximum relative frequency error of 3.0 ppm (6 kHz) should be expected. It is proposed that the scrambling code identification and the TX diversity identification be carried out serially. In both processes, the rake finger RF and the downstream antenna decoupling unit A-DEC are operated in the STTD mode (STTD ON). The scrambling code is identified first of all, after which rapid frequency correction can be carried out, limiting the relative frequency error to a maximum of 1.0 ppm. The TX antenna diversity identification method is then carried out. It should be mentioned that the high degree of robustness of the method according to the invention with respect to frequency errors means that the TX antenna diversity identification method can also be carried out for a higher frequency offset and, for example, also at the same time as the scrambling code identification.

Figure 12:
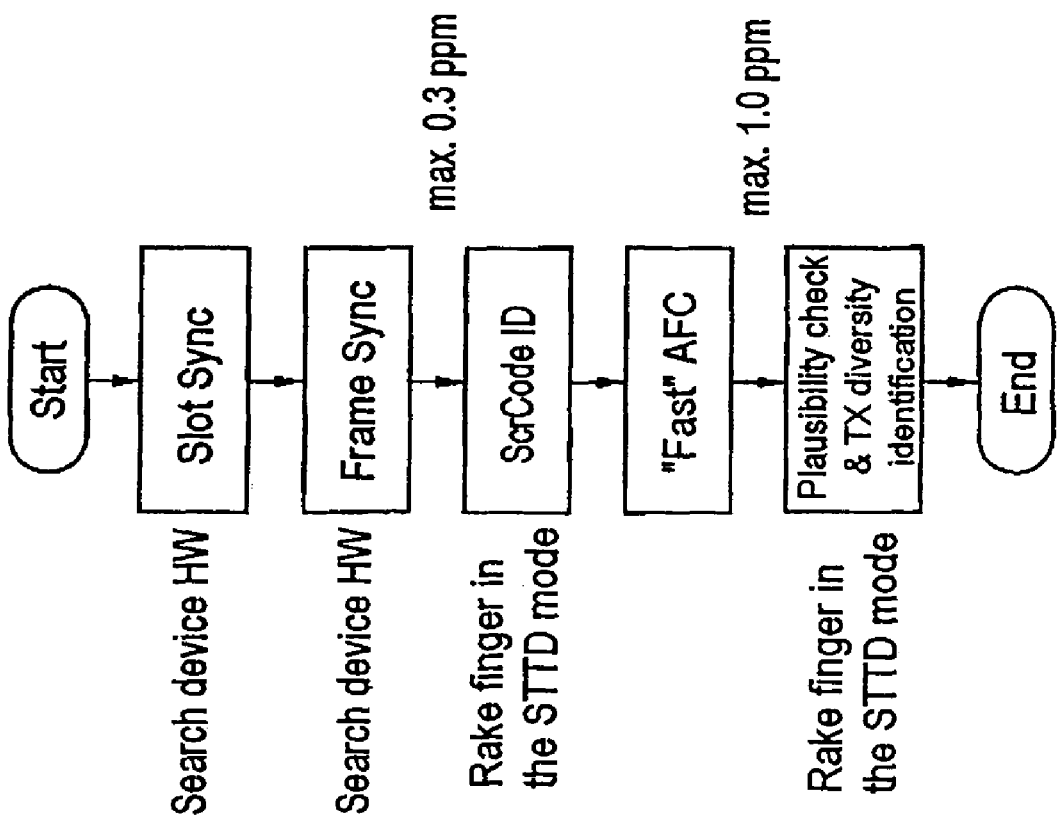
FIG. 12 shows a flowchart for carrying out a cell search during operation.

FIG. 12 shows a flowchart of cell synchronization that takes place during operation. During mobile radio operation, new cells are looked for all the time, and are kept available for a soft handover. After the slot and frame synchronization, the maximum frequency offset to be expected in this case is only 0.5 ppm. The rake finger and the downstream antenna decoupling unit A-DEC are operated in the STTD mode. In this case, the scrambling code identification and the TX antenna diversity identification are carried out at the same time, using the parallel evaluation units EVAL1 and EVAL2.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for identification of a multiple antenna transmission mode in a radio receiver, comprising:
    producing at least two antenna-decoupled data streams in the receiver from a received data signal;
    calculating in the radio receiver a respective first variable for each of the at least two data streams, wherein the first variables are each dependent on a phase difference between successive data items in the respective data stream, wherein the successive data items are successive with respect to one another in the time domain; and
    evaluating the first variables to decide whether the multiple antenna transmission mode is being used in a transmitter that produced the data signal, wherein the decision is dependent on the phase difference between the successive data items in each of the at least two data streams.

2. A method for identification of a multiple antenna transmission mode in a radio receiver, comprising:
    producing at least two antenna-decoupled data streams in the receiver from a received data signal;
    calculating in the radio receiver a respective first variable for each of the at least two data streams, wherein the first variables are each dependent on a phase difference between successive data items in the respective data stream, wherein the successive data items are successive with respect to one another in the time domain; and
    evaluating the first variables to decide whether the multiple antenna transmission mode is being used in a transmitter that produced the data signal, wherein the decision is dependent on the phase difference between the successive data items in each of the at least two data streams, wherein an argument of a complex number depending on the first variables indicates the phase difference between the successive data items in the respective data stream.

3. A method for identification of a multiple antenna transmission mode in a radio receiver, comprising:
    producing at least two antenna-decoupled data streams in the receiver from a received data signal;
    calculating in the radio receiver a respective first variable for each of the at least two data streams, wherein the first variables are each dependent on a phase difference between successive data items in the respective data stream, wherein the successive data items are successive with respect to one another in the time domain; and
    evaluating the first variables to decide whether the multiple antenna transmission mode is being used in a transmitter that produced the data signal, wherein the decision is dependent on the phase difference between the successive data items in each of the at least two data streams, wherein a magnitude of the first variables represents a measure of the signal strength in the respective data stream.

4. A method for identification of a multiple antenna transmission mode in a radio receiver, comprising:
    producing at least two antenna-decoupled data streams in the receiver from a received data signal;
    calculating in the radio receiver a respective first variable for each of the at least two data streams, wherein the first variables are each dependent on a phase change between the data in the respective data stream and, wherein the first variable for the a-th antenna-decoupled data stream is given by the relationship: $p_a(2i) = s_a(i) \cdot S_a^*(i+1)$, where $s_a(i)$ represents a data value relating to a time index "i" of the a-th antenna-decoupled data stream, wherein a=0, 1; and
    evaluating the first variables to decide whether the multiple antenna transmission mode is being used in a transmitter that produced the data signal, wherein the decision is dependent on the phase change between the data in each of the at least two data streams.

5. A method for identification of a multiple antenna transmission mode in a radio receiver, comprising:
    producing at least two antenna-decoupled data streams in the receiver from a received data signal;
    calculating in the radio receiver a respective first variable for each of the at least two data streams, wherein the first variables are each dependent on a phase change between the data in the respective data stream; and
    evaluating the first variables to decide whether the multiple antenna transmission mode is being used in a transmitter that produced the data signal, wherein the decision is dependent on the phase change between the data in each of the at least two data streams, and wherein evaluating the first variables comprises:
        calculating a second variable that is dependent on a phase relationship between the first variables; and
        deciding whether a multiple antenna transmission mode is being used in the transmitter based on the calculated second variable.

6. The method according to claim 5, wherein the second variable comprises a product of the first variable, which is calculated for one data stream, and a complex-conjugate of the first variable, which is calculated for the other data stream, and wherein a decision is made that a multiple antenna transmission mode is present if a real part of the second variable is greater than or equal to zero.

7. A method for identification of a multiple antenna transmission mode in a radio receiver, comprising:
    producing at least two antenna-decoupled data streams in the receiver from a received data signal;
    calculating in the radio receiver a respective first variable for each of the at least two data streams, wherein the first variables are each dependent on a phase change between the data in the respective data stream; and
    evaluating the first variables to decide whether the multiple antenna transmission mode is being used in a transmitter that produced the data signal, wherein the decision is dependent on the phase change between the data in each of the at least two data streams, and wherein evaluating the first variables comprises:
        comparing a magnitude of the first variable associated with the first data stream which is characteristic of the signal power of the first transmission antenna and a magnitude of the first variable associated with the second data stream which is characteristic of the signal power of the second transmission antenna to a threshold value; and
        deciding that a multiple antenna transmission mode is not present when at least one of the magnitudes which are characteristic of the signal power of the transmission antennas is or are less than the threshold value.

8. A method for identification of a multiple antenna transmission mode based on a received data signal in a radio receiver, wherein the received data signal is transmitted from a transmitter that coded the data signal using a scrambling code, comprising:

producing at least two antenna-decoupled data streams in the receiver from the received data signal;

calculating in the radio receiver a respective first variable for each of the at least two data streams, wherein the first variables are each dependent on a phase change between the data in the respective data stream;

evaluating the first variables to decide whether the multiple antenna transmission mode is being used in the transmitter that produced the data signal, wherein the decision is dependent on the phase change between the data in each of the at least two data streams; and identifying the transmitted scrambling code in the receiver by evaluating at least one of the two first variables, wherein the scrambling code is identified as a function of only one of the two first variables in a first identification mode, and the scrambling code is identified as a function of both first variables in a second identification mode.

9. An apparatus for identification of a multiple antenna transmission mode in a radio receiver, comprising:

an antenna decoupling unit configured to produce at least two antenna-decoupled data streams from a received data signal;

a calculation unit within the radio receiver, the calculation unit configured to receive the at least two antenna-decoupled data streams and calculate a first variable for each of the at least two data streams, wherein each first variable is dependent on a phase difference between successive data items in the respective data stream, wherein the successive data items are successive with respect to one another in the time domain; and an evaluation unit configured to receive the first variables and decide as a function of the first variables whether a multiple antenna transmission mode is being used in a transmitter that produced the data signal, wherein the decision is dependent on the phase difference between the successive data items in each of the at least two data streams.

10. An apparatus for identification of a multiple antenna transmission mode in a radio receiver, comprising:

an antenna decoupling unit configured to produce at least two antenna-decoupled data streams from a received data signal;

a calculation unit within the radio receiver, the calculation unit configured to receive the at least two antenna-decoupled data streams and calculate a first variable for each of the at least two data streams, wherein each first variable is dependent on a phase change between the data in the respective data stream and wherein the first variable for an a-th antenna-decoupled data stream is given by the relationship $p_a(2i)=s_a(i) \cdot S_a^*(i+1)$, where $s_a(i)$ represents a data value relating to the time index "i" of the a-th antenna-decoupled data stream, wherein a=0, 1;

an evaluation unit configured to receive the first variables and decide as a function of the first variables whether a multiple antenna transmission mode is being used in a transmitter that produced the data signal, wherein the decision is dependent on the phase change in each of the at least two data streams.

11. An apparatus for identification of a multiple antenna transmission mode in a radio receiver, comprising:

an antenna decoupling unit configured to produce at least two antenna-decoupled data streams from a received data signal;

a calculation unit within the radio receiver, the calculation unit configured to receive the at least two antenna-decoupled data streams and calculate a first variable for each of the at least two data streams, wherein each first variable is dependent on a phase change between the data in the respective data stream;

wherein the calculation unit is configured to calculate a second variable, which is dependent on a phase relationship between the two first variables; and an evaluation unit configured to receive the first variables and decide as a function of the first variables whether a multiple antenna transmission mode is being used in a transmitter that produced the data signal, wherein the decision is dependent on the phase change in each of the at least two data streams; and wherein the evaluation unit is configured to decide as a function of the calculated second variable whether a multiple antenna transmission mode is being used in the transmitter.

12. The apparatus according to claim 11, wherein the calculation unit is further configured to calculate a product of the first variable calculated for one data stream, and a complex-conjugate of the first variable calculated for the other data stream, and decide that a multiple antenna transmission mode is present if a real part of the second variable is greater than or equal to zero.

13. An apparatus for identification of a multiple antenna transmission mode in a radio receiver, comprising:

an antenna decoupling unit configured to produce at least two antenna-decoupled data streams from a received data signal;

a calculation unit within the radio receiver, the calculation unit configured to receive the at least two antenna-decoupled data streams and calculate a first variable for each of the at least two data streams, wherein each first variable is dependent on a phase change between the data in the respective data stream; and an evaluation unit configured to receive the first variables and decide as a function of the first variables whether a multiple antenna transmission mode is being used in a transmitter that produced the data signal, wherein the decision is dependent on the phase change in each of the at least two data streams;

wherein the evaluation unit is further configured to compare a magnitude of the first variable which is associated with the first data stream which is characteristic of the signal power of a first transmission antenna and a magnitude of the first variable which is associated with the second data stream which is characteristic of the signal power of a second transmission antenna to a threshold value; and wherein the evaluation unit is configured to decide that a multiple antenna transmission mode is not being used in the transmitter if at least one of the magnitudes which are characteristic of the signal powers of the transmission antennas is or are less than the threshold value.

14. An apparatus for identification of a multiple antenna transmission mode in a radio receiver, comprising:

an antenna decoupling unit configured to produce at least two antenna-decoupled data streams from a received data signal;

a calculation unit within the radio receiver, the calculation unit configured to receive the at least two antenna-decoupled data streams and calculate a first variable for each of the at least two data streams, wherein each first variable is dependent on a phase change between the data in the respective data stream; and an evaluation unit configured to receive the first variables and decide as a function of the first variables whether a multiple antenna transmission mode is being used in a transmitter that produced the data signal, wherein the decision is dependent on the phase change in each of the at least two data streams;

a further evaluation unit connected downstream from the calculation unit, and configured to evaluate at least one of the two first variables to identify a scrambling code which is being used by the transmitter for the coding of the transmitted data signal, wherein the further evaluation unit is configured to be operated in two or more identification modes, wherein the scrambling code is identified as a function of only one of the two first variables in a first identification mode, and the scrambling code is identified as a function of both first variables in a second identification mode.

* * * * *